United States Patent
Dubey et al.

[11] Patent Number: 5,811,830
[45] Date of Patent: Sep. 22, 1998

[54] QUANTUM WELL OPTICAL WAVEGUIDE PHASE SHIFTER

[75] Inventors: Madan Dubey, South River; Hong Liang Cui, Jersey City; Charles D. Hechtman, Hopewell; Norman J. Horing, Hoboken; George F. McLane, Point Pleasant Beach, all of N.J.

[73] Assignee: The United States of America as represented by the Secretary of the Army, Washington, D.C.

[21] Appl. No.: 482,154

[22] Filed: Jun. 8, 1995

[51] Int. Cl.[6] ....................................................... G02F 1/015
[52] U.S. Cl. .................. 257/14; 385/3; 385/130; 332/146
[58] Field of Search .................................... 257/9, 21, 12, 257/14; 327/231; 359/279, 183; 385/130, 129, 131, 132, 3; 332/146

[56] References Cited

U.S. PATENT DOCUMENTS 4,806,998  2/1989  Vinter et al. ............................... 257/14

OTHER PUBLICATIONS

Ramo et al, "Fields and Waves in Communication Electronics", Wiley and Sons, New York, 1984; pp. 375–376.
Koul et al, "Microwave and Millimeter Wave Phase Shifters", Artech House, Norwood, Massachusetts, vol. 1, 1991, pp. 73–89.

*Primary Examiner*—Jerome Jackson
*Assistant Examiner*—John Guay
*Attorney, Agent, or Firm*—Michael Zelenka; George B. Tereschuk

[57] ABSTRACT

The present invention is achieved by layering a dielectric slab between a ground plane and a two dimensional quasi quantum well heterostructure and by switching between an unbiased state and a negative potential which is established between the quantum well heterostructure and the ground plane. In the unbiased state, the device supports wave propagation in the dielectric with a phase velocity similar to that of a wave propagating in a parallel plate waveguide. Upon application of the bias voltage, that is establishing a negative potential difference between contacts based on either side of the quantum well heterostructure, the conductivity of the quantum well decreases. Therefore, as the carrier wave propagates the wave interacts with a boundary similar to that of a dielectric-air interface. This new boundary condition, in turn, produces a faster phase velocity. Hence, toggling the bias modulates the quantum well conductivity which changes the phase velocity of the carrier wave.

5 Claims, 1 Drawing Sheet

QUANTUM WELL OPTICAL WAVEGUIDE PHASE SHIFTER

GOVERNMENT INTEREST

The invention described herein maybe made, used, sold, or licensed by, or on behalf of, the United States of America without the payment to us of any royalties thereon.

FIELD OF THE INVENTION

This invention relates in general to the field of optical, quasi-optical and millimeter wave electronic devices and, in particular, to waveguides used to control the phase of a guided optical and/or quasi-optical carrier signal.

BACKGROUND OF THE INVENTION

It is a well documented phenomenon that a quantum well optical waveguide operating in an unbiased state, that is a state where the quantum well resembles a good conductor, supports wave propagation in a dielectric with a phase velocity similar to that of a wave propagating in a parallel plate waveguide. One publication describing parallel plate waveguides is *Fields and Waves in Communication Electronics*, by Ramo et al, Wiley and Sons, New York 1984, which is incorporated herein by reference.

Moreover, several types of optical and quasi-optical phase shifters are also known. Several different types of these phase shifters are listed and described in such texts as *Microwave and Millimeter Wave Phase Shifters*, Volume 1, Koul et al, Artech House, *Norwood, Massachusetts*, 1991, which is also incorporated herein by reference. Unfortunately, typical phase shifters usually exhibit high loss and a low bandwidth, 1 Ghz, for internal modulators, that is modulation via the source, and 15 Ghz for external modulators. Accordingly, there exists a need in this art to provide for a phase shifter which has a much higher bandwidth but experiences only the same approximate losses. The present invention addresses such a need.

SUMMARY OF THE INVENTION

Accordingly, one general object of the present invention is to provide for an optical or quasi-optical phase shifter which has a very high bandwidth exceeding 100 Ghz with losses less than or equal to current state of the art phase shifters.

Another object of the present invention is to provide for such a phase shifter which can be fully integrated into existing optic/photonic circuits or millimeter wave integrated circuits (MMIC).

A still further object of the present invention is to provide for a phase shifter which is extremely small, approximately 10 wavelengths.

These and other objects of the present invention are achieved by layering a dielectric slab between a ground plane and a quasi two dimensional quantum well heterostructure and establishing a negative potential between the quantum well heterostructure and the ground plane. In an unbiased state, the device supports wave propagation in the dielectric with a phase velocity similar to that of a wave propagating in a parallel plate waveguide. Upon application of a bias voltage, that is, establishing a negative potential difference between contacts based on either side of the quasi quantum well heterostructure, the conductivity of the quasi quantum well heterostructure decreases. Therefore, as the carrier wave propagates, the wave interacts with a boundary similar to that of a dielectric-air interface. This new boundary condition, in turn, produces a faster phase velocity. Hence, toggling the bias modulates the quasi quantum well conductivity which changes the phase velocity of the carrier wave.

BRIEF DESCRIPTION OF THE DRAWINGS

The present invention will be better understood in light of the ensuing Detailed Description of the Invention and the Drawings wherein.

It should be noted that particular dimensions of the present invention have not been drawn to scale and that from the following description one skilled in the art would be able to fabricate the device for particular applications.

DETAILED DESCRIPTION OF THE INVENTION

Figure 1:
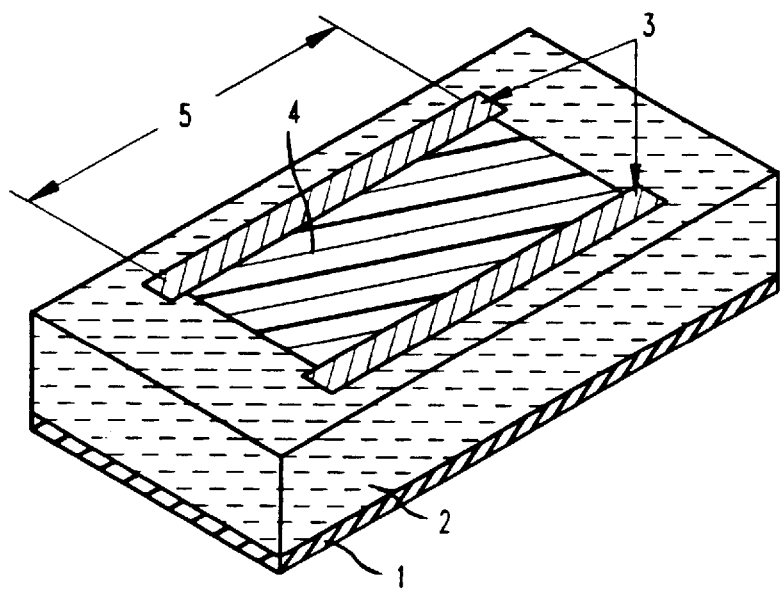
FIG. 1 is a perspective view of the preferred embodiment of the invention.
Figure 2:
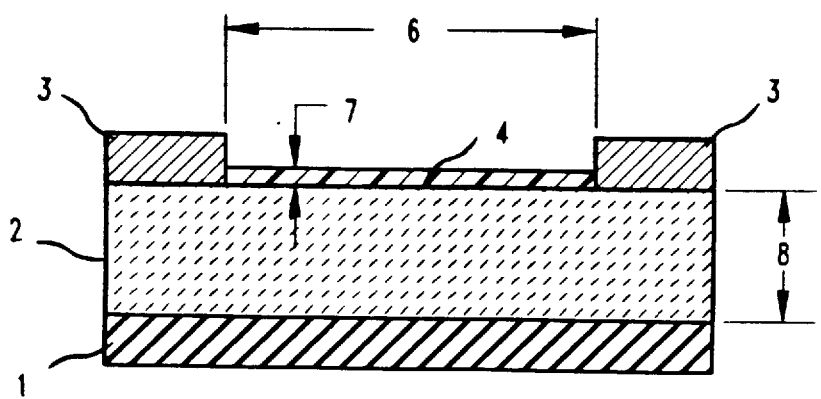
FIG. 2 is a cross-sectional view of the preferred embodiment of the invention.

Referring now to the FIGS. 1 and 2, there is shown a prospective and a cross-sectional view of the preferred embodiment of the invention. As shown, a dielectric slab 2. is layered between a ground plane 1 and a two dimensional quantum well structure 4. The two dimensional quantum well structure referred to herein is not, in the preferred embodiment, a multiple quantum well structure, such as several periods of alternating layers of GaAs and AlGaAs, but rather is a thin ($\approx$30Å thick) layer of a material, such as Cobalt-disilicide. As those skilled in the art will recognize from this disclosure, the width and length of this layer will be dependent upon the wavelength of the carrier signal and the application in which the phase shifter will be used.

In order to establish a negative potential difference between the two dimensional quantum well structure 4 and the ground plane 1, metal contacts 3 are disposed laterally along the length 5 (FIG. 1) of the two dimensional quantum well structure 4 on the dielectric slab 2.

When the quantum well waveguide of the present invention is operated in the unbiased state, wave propagation is supported in the dielectric slab 2 with a phase velocity similar to that of a wave propagating in a parallel plate waveguide. This similarity is because in an unbiased state, the two dimensional quantum well structure 2 has essentially the same conductivity as the ground plane 1. Waveguiding principles for parallel plate waveguides are generally described in Ramo et al at pages 375–377, supra. These principles are well known to those skilled in the art and therefore, need not be explained further.

When a bias is applied to the two dimensional quantum well structure 2 to establish a negative potential bias, the conductivity of the quantum well heterostructure 2 will decrease to a point such that its conductivity is similar to that of air. Hence, as the carrier wave propagates past the quantum well heterostructure, the propagation of the carrier signal will now act similar to that of a carrier signal propagating along a dielectric-air interface. This new boundary interface produces a faster phase velocity and therefore, the product of the device width and the phase velocity difference results in a carrier wave phase shift. Therefore, switching the bias along the two dimensional quantum well structure 2 will modulate the conductivity between that of the ground plane 1 and air, which, in turn, changes the phase velocity of the carrier wave similar to changing it from a parallel plate waveguide to a dielectric-air waveguide.

As those skilled in the art will readily recognize there several different variations of the present invention and accordingly the inventors herein do not wish to be limited by the foregoing description but only by the following claims.

What is claimed is:

1. An optical phase shifter comprising:

a ground plane having a predetermined conductivity;

a two dimensional quantum well structure, the quantum well structure having at least two lateral sides and formed such that at a zero bias the quantum well structure has substantially the same conductivity as the ground plane and that at a predetermined bias the conductivity of the quantum well structure is decreased;

a dielectric slab sandwiched between the ground plane and the quantum well structure; and at least two electrical contacts disposed along the lateral sides of the quantum well structure such that when a bias is applied the conductivity of the quantum well structure decreases.

2. The optical phase shifter of claim 1 wherein the conductivity of the quantum well structure is reduced to the conductivity of air upon application of the bias.

3. The optical phase shifter of claim 1 wherein the two dimensional quantum well structure is a thin layer of cobalt-disilicide.

4. The optical phase shifter of claim 1 further comprising:

the quantum well structure being a thin layer of cobalt-disilicide; and said thin layer of cobalt-disilicide having a width and a length selected based upon the wavelength of a carrier signal propagating through the phase shifter.

5. The optical phase shifter of claim 1 further comprising the quantum well structure being a thin layer of cobalt-disilicide that is 30 Å thick.

* * * * *